Patented Feb. 1, 1938

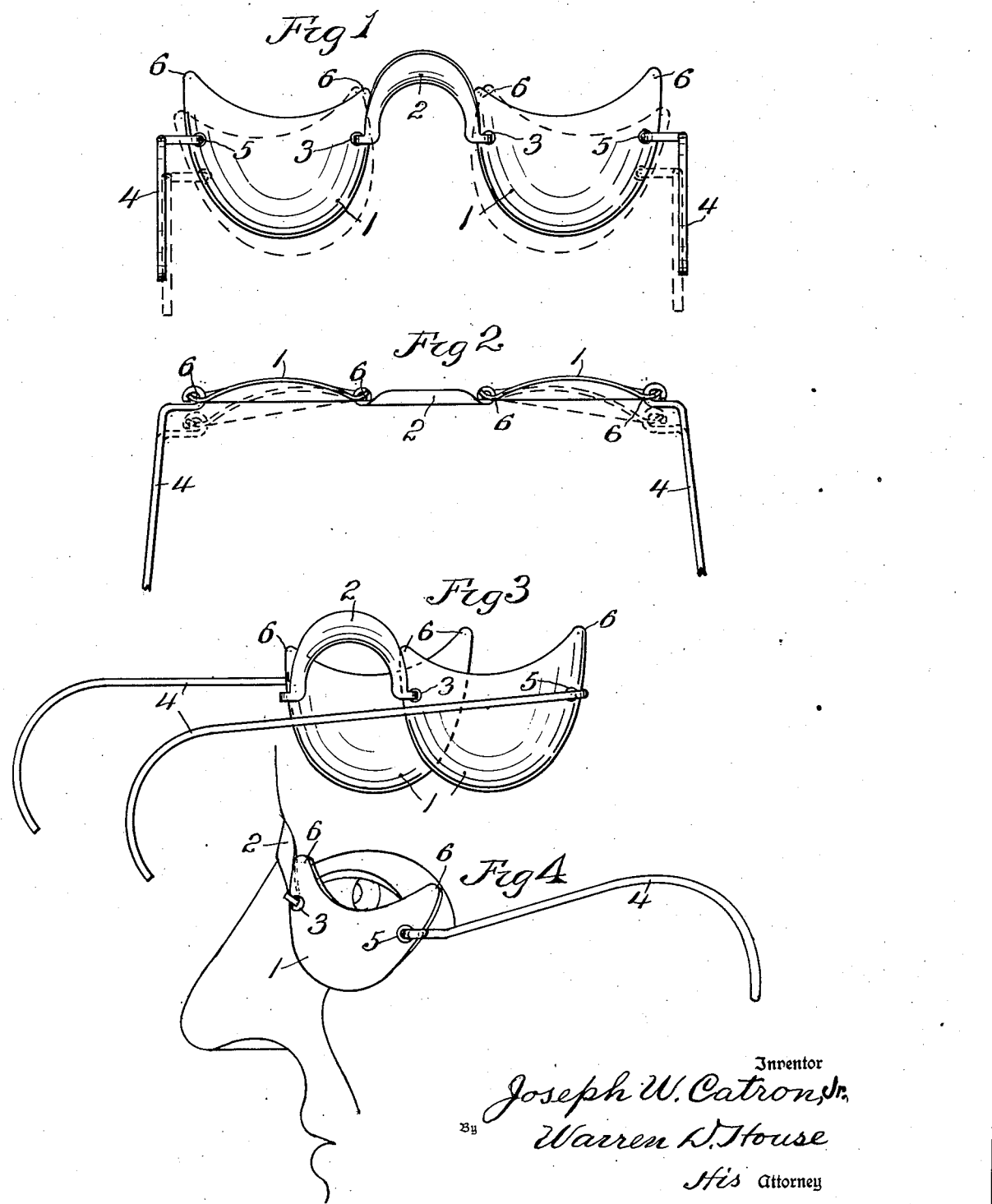

2,107,103

UNITED STATES PATENT OFFICE 2,107,103

EYESHADE

Joseph W. Catron, Jr., Fortescue, Mo.

Application June 1, 1937, Serial No. 145,802

2 Claims. (Cl. 2—12)

My invention relates to improvements in eye shades, of a type adapted for use in the manner of spectacles.

One of the objects of my invention is to provide an eye shade adapted to intercept reflected light from in front and below, and for protecting the eyes from lateral glare, while permitting straight ahead vision.

A further object of my invention is to provide an eye shade of the kind described with shields adapted to conform to the shape of the face, so that when held thereagainst, the shields will exclude rays entering the eyes from between the edges of the shields and the face.

Still another object of my invention is the provision of novel attaching connections between the shields and the nose piece and temple bars by which the shields will be held conformed to the face irrespective of the particular contour thereof.

My invention provides further an eye shade of the kind described which is simple, cheap, strong, durable, not likely to get out of order, which is collapsible to flat compact form, and which is efficient in its operation.

The novel features of my invention are hereinafter fully described and claimed.

In the accompanying drawing illustrative of the preferred form of my invention,

Fig. 1 is a rear elevation of my improved eye shade.

Fig. 2 is a top view of the same.

Fig. 3 shows the eye shade collapsed.

Fig. 4 is a perspective view showing the eye shade in operative position on a face.

Similar characters of reference designate similar parts in the different views.

1 designates each of two eye shields, which, preferably, are crescent shaped and concavo-convex.

2 designates an inverted U shaped nose piece the ends of which have universal joint connections with the inner edge portions of the shields 1, which connections are effected, as shown, by looping the ends of the nose piece 2 through holes 3 provided through the shields 1 adjacent to the inner edges thereof.

4 designates two temple bars having universal joint connections with the shields 1 at the outer edge portions thereof, effected by looping the forward end portions of the temple bars 4 loosely through holes 5 through the shields 1 adjacent to the outer edges thereof.

In applying the eye shade, the nose piece 2 is placed over the upper end portion of the nose, and the temple bars 4 are passed over and engage the ears in the usual manner.

The temple bars 4 having downwardly extending rear ends adapted to engage respectively the rear sides of the ears, and are of such length as to draw the shields 1 tightly against the face, as shown in Fig. 4, in which position the shields will be substantially upright with the middle portions of the concave upper edges lower than and respectively forward of the pupils. The cusps, designated by 6, of each shield 1 will be disposed at opposite sides of and higher than the adjacent pupil.

The shields are of material that will exclude glare light. They may be opaque and of metal, or they may be colored glass and semi-transparent, so as to permit some light to pass through, but to exclude glare light.

By reason of the universal joint connections between the shields 1 and the nose piece 2 and temple bars 4, the shields when applied will adapt themselves to the particular form of face to which they are applied, thus preventing light entering between the shield's edges and the skin against which they are held.

The cusps 6 by being at opposite sides of and higher than the pupils, exclude lateral glare entering the pupils.

When not in use the eye shade by reason of the loose joint connections between the shields and the nose piece and temple bars, may be collapsed to compact flat form, as shown in Fig. 3.

In Figs. 1 and 2, are indicated in dotted lines how the shields 1 may swing to different positions for adapting the eye shade to different forms of faces.

Many modifications of my invention within the scope of the appended claims, may be made without departing from the spirit of my invention.

What I claim is:—

1. An eye shade comprising two glare shields, an inverted U shaped nose piece having universal joint connections respectively with the inner edge portions of said shields, and two temple bars having universal joint connections respectively with the outer edge portions of said shields and having downwardly extending rear ends adapted to respectively engage the rear sides of the ears, said nose piece and said temple bars in their operative positions holding said shields substantially upright and conformed to the face.

2. An eye shade comprising two crescent shaped glare shields, a nose piece having universal joint connections respectively with the inner edge portions of said shields, and two temple bars having universal joint connections respectively with the outer edge portions respectively of the outer edge portions of said shields, said nose piece and said temple bars in their operative positions holding said shields substantially upright and conformed to the face, with the middle portions of their concave upper edges lower than and respectively forward of the pupils, and with the cusps of each of said shield respectively at opposite sides of and higher than the adjacent pupil.

JOSEPH W. CATRON, Jr.